Oct. 20, 1970 W. W. DRUMMOND 3,535,097
FORMING AND WINDING GLASS FIBER STRAND
Filed Jan. 10, 1968 2 Sheets-Sheet 1

INVENTOR
WARREN W. DRUMMOND
BY Chisholm & Spencer
ATTORNEYS

Oct. 20, 1970  W. W. DRUMMOND  3,535,097
FORMING AND WINDING GLASS FIBER STRAND
Filed Jan. 10, 1968  2 Sheets-Sheet 2
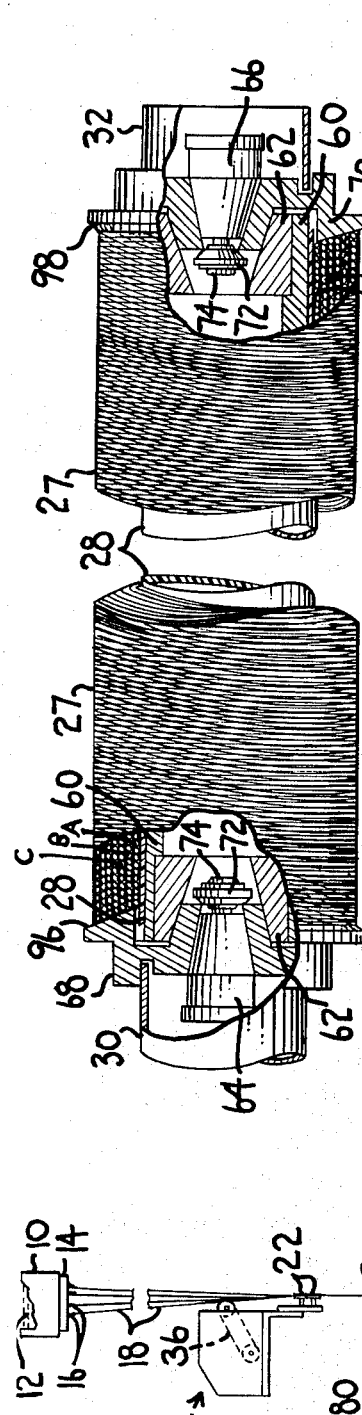
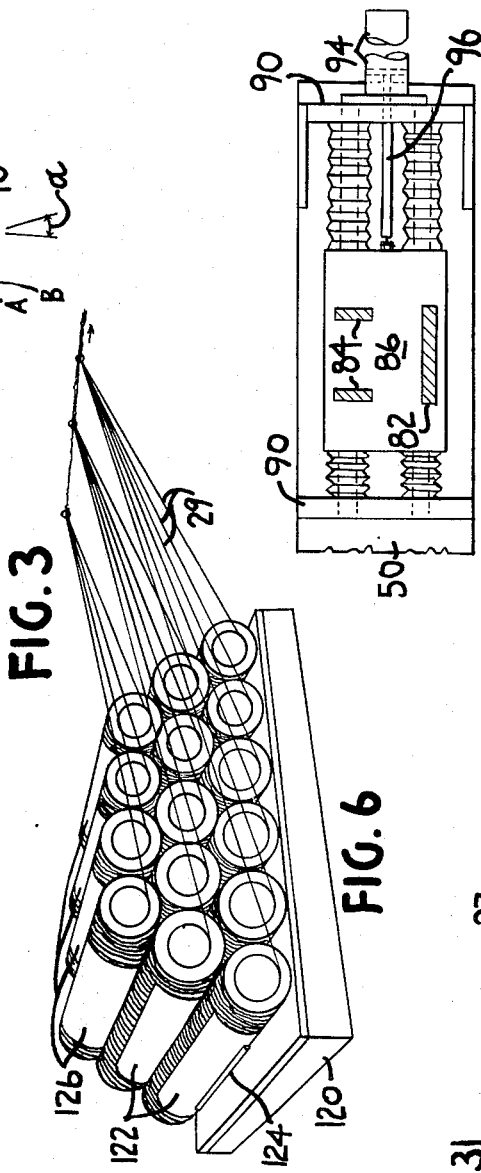
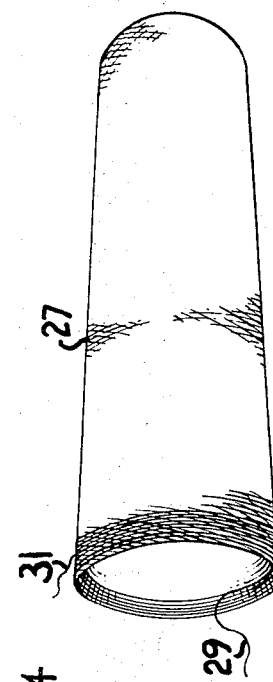
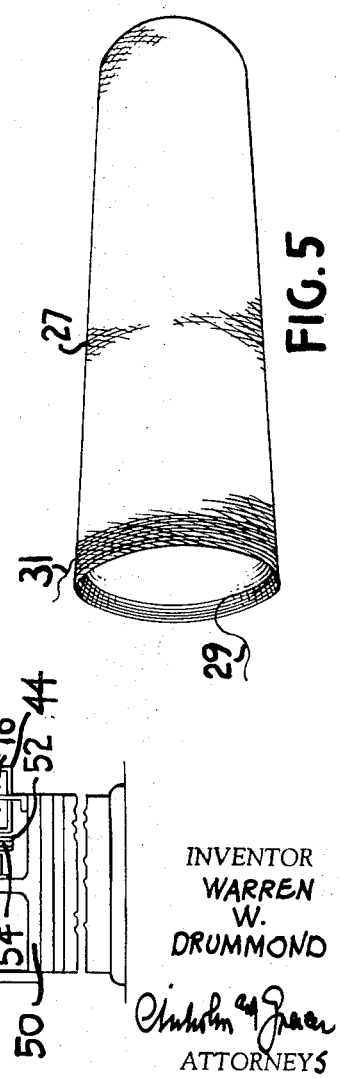
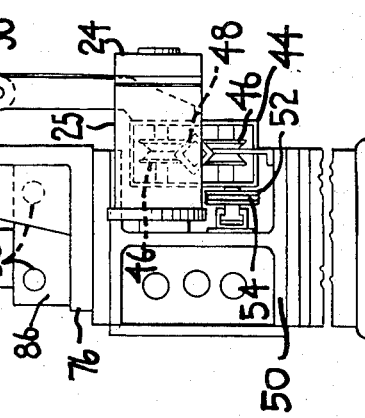
INVENTOR
WARREN W. DRUMMOND
ATTORNEYS United States Patent Office 3,535,097
Patented Oct. 20, 1970

3,535,097
FORMING AND WINDING GLASS FIBER STRAND
Warren W. Drummond, Allison Park, Pa., assignor to
PPG Industries, Inc., a corporation of Pennsylvania
Filed Jan. 10, 1968, Ser. No. 696,791
Int. Cl. C03b 37/00
U.S. Cl. 65—2     8 Claims

ABSTRACT OF THE DISCLOSURE

Forming packages of glass fiber strand containing a substantially uniform thickness of wound strand are provided by oscillating the strand and winding the oscillated strand in a plurality of superimposed layers on a rotating cylindrical surface bounded by axially-spaced surfaces that extend outward from the strand-collecting surface in gradually-diverging relationship. The ends of the package are formed by winding the strand against one of the diverging surfaces each time a layer of strand is completed. After winding, the gradually-diverging surfaces are removed to provide a forming package having substantially cylindrical inner and outer surfaces and end surfaces which extend outward in gradually-diverging relationship from the inner surface of the package.

BACKGROUND OF THE INVENTION

The present invention relates to a method and apparatus for forming and collecting fibers of heat softenable material in wound packages and has particular relation to forming and winding glass fiber strand material.

In one process for producing glass fiber strand material, streams of molten glass flow from orifices in a bushing and are attenuated into small-diameter fibers. The fibers are passed through a guide where they are grouped together as a strand and the strand is wound around a rotating cylindrical tube mounted on a rotating cylinder known as a collet. The rotating tube is known as a forming tube and supplies the force to attenuate the fibers and wind the strand to form a package generally referred to as a forming package.

Paper or plastic forming tubes about four to eight inches in diameter and six to twelve inches in length are usually employed in conventional glass fiber strand forming processes. Conventional forming packages may contain from about two to eight pounds of glass fiber strand material and usually contain less than about five pounds of glass fiber strand material.

There is no twist applied to the strand as it is formed. A size is applied to the fibers before the strand is wound to bond the fibers together and provide strand integrity.

As the strand is wound on the forming tube, it is given a primary and a secondary traversing motion. The primary traversing motion delivers the strand lengthwise of the forming tube. The secondary traversing motion varies the angular relationship between the strand and the forming tube to wind each wrap of strand in crossing relation to the preceding wrap of strand. This latter motion produces an open wind which is preferred to a parallel wind.

If a parallel wind is used, individual fibers from adjacent wraps of strand tend to bind together making it difficult to unwind the strand from the forming tube. With an open wind, successive wraps of strand cross each other at an angle and do not tend to bind together.

An open wind is provided by engaging the strand with a high frequency strand oscillator, usually a rotating cam. The oscillator provides rapid oscillating motion to the strand as it is delivered to the forming tube. The rapid oscillating motion is frequently referred to as a standing sine wave. The oscillating motion applied to the strand may have an amplitude of from about 1/16 inch to two or three inches. The frequency of the oscillating motion is normally greater than a thousand cycles per minute. For example, when a rotating cam is employed, it is usually rotated at a speed between about 1,000 and 25,000 revolutions per minute.

The primary traversing motion is a high-amplitude low-frequency motion. The amplitude is dependent upon the axial length of the package which is to be formed. The oscillated strand is usually delivered in opposite directions along some predetermined axial length of the forming tube to wind a package comprising a plurality of superimposed layers of strand. This is accomplished by providing relative reciprocal movement between the forming tube and the oscillator along a path parallel to the axis of rotation of the forming tube.

Either the oscillator or forming tube, or both, may be moved relative to the other. The relative movement is such that each layer of strand is first formed at one end of the tube and progresses slowly, e.g., about 50 to 200 inches per minute, toward the other end of the tube. When a layer of predetermined length is formed, the delivery of strand in one direction is terminated and strand is delivered in the opposite direction to wind another layer on top of the previously wound layer. The relative reciprocal movement is slow enough with respect to the rotation of the forming tube that the strand is deposited upon itself in each layer to a thickness of several strand diameters.

In the process just described, the diameter of the fibers is a function of the attenuating force applied to the streams of molten glass and the viscosity of the molten glass. Fibers of substantially uniform diameter along the full length of the strand are preferred. Since the atenuating force is a function of the winding speed and the winding speed increases with the diameter of the package, additional control means are normally employed to reduce the winding speed as the package is formed, or increase the temperature of the glass within the bushing, to maintain a substantially constant attenuating force. Both of these mehods of compensating for the winding speed increase due to package build-up are known in the fiber glass forming art. However, because of the geometry of the packages produced by means of this process, changes in the attenuating force applied to the streams of glass still exist which produce variations in the diameter of the fibers being formed.

The strand in most conventional forming packages is wound to a greater depth near the center of the length of the forming tube than at the ends of the forming tube. This results from the outward component of the oscillating motion applied to the strand. These forming packages are barrel-shape in appearance. The external surface of these packages tapers towards the strand-collecting surface of the forming tube at each end of the package. The oscillated strand is traversed along the length of the package and when delivered to the tapered end surfaces of the package is subjected to a rather abrupt change in winding speed. The strand is wound at a greater speed near the top of the tapered surface than near the bottom. The change in speed is dependent upon the diameter of the forming tube and the depth of strand wound on the forming tube. The winding speed may decrease from about 10 to 30 percent for strand being wound at a depth of one inch on a forming tube having a diameter of four to twelve inches. This change reduces the attenuating force applied to the streams of molten glass with the net effect that the diameter of the fibers formed as the strand is being wound on the tapered end surfaces of the package is greater than the diameter of the fibers formed as the strand is wound on the substantially level surface of the package between the end surfaces.

This problem is less critical if the strand is not wound to a substantial depth, but the needs are such that the trend is toward forming larger packages of glass fiber strand.

The production of larger forming packages has long been desired in the glass fiber forming art. Larger packages containing some even multiple of the amount of strand that is wound on the forming tubes, twisted and rewound on a bobbin, have been desired for packages of strand destined for the textile industry. Such forming packages enable the glass yarn producer to supply splice-free yarn to the weaver. The increasing demand for continuous fiber glass strand material in other areas, for example, for reinforcing plastics and rubber, as well as forming mat products, further accentuates the need for larger forming packages and novel packages which reduce handling and processing time.

For these operations, continuous fiber glass strand is conventionally supplied in the form of roving packages. A roving package comprises a plurality of glass fiber strands which have been unwound from a forming tube and rewound in parallel fashion on a bobbin or other rotating surface. The number of strands rewound in a roving package is generally referred to as the number of ends. The number of ends wound in a roving package varies with the needs of particular customers.

The extreme variations in winding speed encountered with the barrel-shape forming packages previously described can be avoided by forming packages with substantially cylindrical exterior surfaces. Such packages are usually referred to as flat or level packages since most forming tubes are rotated with their axes disposed in a horizontal plane.

Larger, level forming packages may be produced in the manner disclosed in U.S. Pat. 3,151,963. In this patent relative reciprocatory movement between the oscillator and the forming tube is provided to form a level package having inwardly tapering end surfaces. Successive reciprocatory movements are progressively shortened as the strand is wound to provide a level package comprising a plurality of layers of strand each of which is of shorter axial length than the preceding layer. Such a forming package, although level and larger than the conventional barrel-shaped forming packages, requires the use of a stroke-shortening device or other control means for progressively shortening the length of each relative reciprocating movement between the oscillator and forming tube.

However, even in this process the oscillating movement imparted to the strand causes the strand to slough over the end of each layer of strand thereby causing a slight change in the drawing speed and attenuating force applied to the streams of molten glass. In addition, the tapered ends of the package are open thereby permitting the size on the strand to dry. This causes the size on the strand interior of the ends to migrate toward the ends of the package. Moreover, since each successive layer of strand is of shorter axial length than the preceding layer, such a package does not contain as great a mass of glass fiber strand as a forming package of similar dimensions with each successive layer of strand of the same or greater length than the preceding layer.

A method of and apparatus for forming large packages of glass fiber strand is also disclosed in applicant's copending patent application Ser. No. 602,433, filed Oct. 5, 1966, now abandoned. In this application the problem of the continually-increasing tension incurred when winding strand to a relatively great depth is minimized through the use of a driven godet wheel which engages the strand before it is wound and imparts a forward thrust to the strand thereby reducing the tension on the strand as it is wound onto the package.

However, the development of larger forming packages alone will not completely satisfy the needs of the glass fiber forming industry. The physical characteristics of the forming packages and the repetitive handling of the strand before it is incorporated in an end product should also be improved. In the package per se, the physical characteristics should be such that the forming tubes can be removed to provide self-supporting packages for use in subsequent operations. Such large, level, self-supporting forming packages could then be provided as a direct source of continuous glass fiber strand material for use in continuous processes, thereby eliminating the intermediate step of rewinding the strand in the form of roving packages. Such packages would also minimize handling in the subsequent continuous process since such package would provide a greater continuous supply of glass fiber strand than conventional roving packages. By eliminating the intermediate processing steps a decided improvement in cost and quality of the product is obtained.

The present invention satisfies several of the previously described needs of the glass fiber forming industry.

SUMMARY OF THE INVENTION

Level forming packages of continuous glass fiber strand are formed by winding the strand on a rotating cylindrical surface bounded by axially-spaced surfaces which extend outward in gradually diverging relationship from the strand-collecting surface. The strand is alternately wound against one of the axially-spaced surfaces each time a layer of strand is completed to initiate winding of a superimposed layer of strand with the axial end of the superimposed layer of strand spaced outward an incremental distance from the corresponding end of the layer of strand just completed. The diverging relationship of the axially-spaced surfaces is such as to restrict the outward component of the lateral throw imparted to the strand by the oscillator to wind a package having end surfaces complementary to the axially-spaced surfaces bounding the strand-collecting surface. After the package is formed, the surfaces are removed to provide an open-ended package having a substantially cylindrical outer surface.

In a preferred embodiment, the strand-collecting surface is also removed to provide a hollow, open-ended, forming package having substantially cylindrical inner and outer surfaces and end surfaces which gradually diverge outward from the axially-spaced ends of the inner surface.

The preferred apparatus for forming the packages of this invention comprises a collapsible cylindrical forming tube positioned on a mandrel supported at both ends by removable spindles which permit rotary movement of the mandrel. Members associated with the spindles provide surfaces adjacent each axially-spaced end of the forming tube which extend outward from the strand-collecting surface of the forming tube at an angle between about 95° and 105°. At least one of the spindles supporting the mandrel and forming tube is power driven to drive the mandrel and forming tube about the longitudinal axis of the mandrel to provide the attenuating and winding force required to form the fibers and wind the strand. After a package is formed, the spindles and their associated members are withdrawn from the mandrel and forming tube.

The ends of the packages of this invention are formed by winding the strand against the gradually-diverging surfaces previously referred to. This method prevents sloughing of the strand over the ends of the package and thereby provides a substantially constant winding and attenuating force which produces fibers having a more uniform diameter along the length of the strand than heretofore possible.

Winding the strand against the gradually-diverging surfaces also prevents drying of the size on the strand at the ends of the package and the accompanying, undesirable migration of size from the strand interior of the package to the strand near the ends of the forming package.

This method and apparatus permits winding of large, substantially cylindrical packages of strand without the need of progressively shortening the relative reciprocal movement between the forming tube and oscillator as taught by prior art.

In addition, the method and apparatus of this invention, when employed in conjunction with the tension-reducing method and apparatus of applicant's copending patent application Ser. No. 602,433, filed Oct. 5, 1966 now abandoned, permits winding of large, open, self-supporting cylindrical forming packages which can be stacked in a plurality of superimposed horizontal rows to provide a direct supply of a plurality of glass fiber strands for a continuous process.

For a more detailed description of the method and apparatus of this invention, and the forming packages produced thereby, reference may be made to the accompanying drawings.

BRIEF DESCRIPTION OF THE DRAWINGS

In the drawings wherein like numerals represent like parts:

FIG. 2 is a side elevational view of the apparatus illustrated in FIG. 1;

FIG. 3 is an enlarged diagrammatic elevation, partly in section, illustrating a portion of the winding apparatus of FIG. 1 and a forming package produced thereon;

FIG. 4 is a plan view taken on line 4—4 of FIG. 1;

FIG. 5 is a perspective view of a glass fiber forming package produced in accordance with this invention, and FIG. 6 is a perspective view of a plurality of the forming packages of this invention arranged in superimposed horizontal rows to provide a supply of glass fiber strands for a continuous process.

DESCRIPTION OF THE PREFERRED EMBODIMENT

Figure 1:
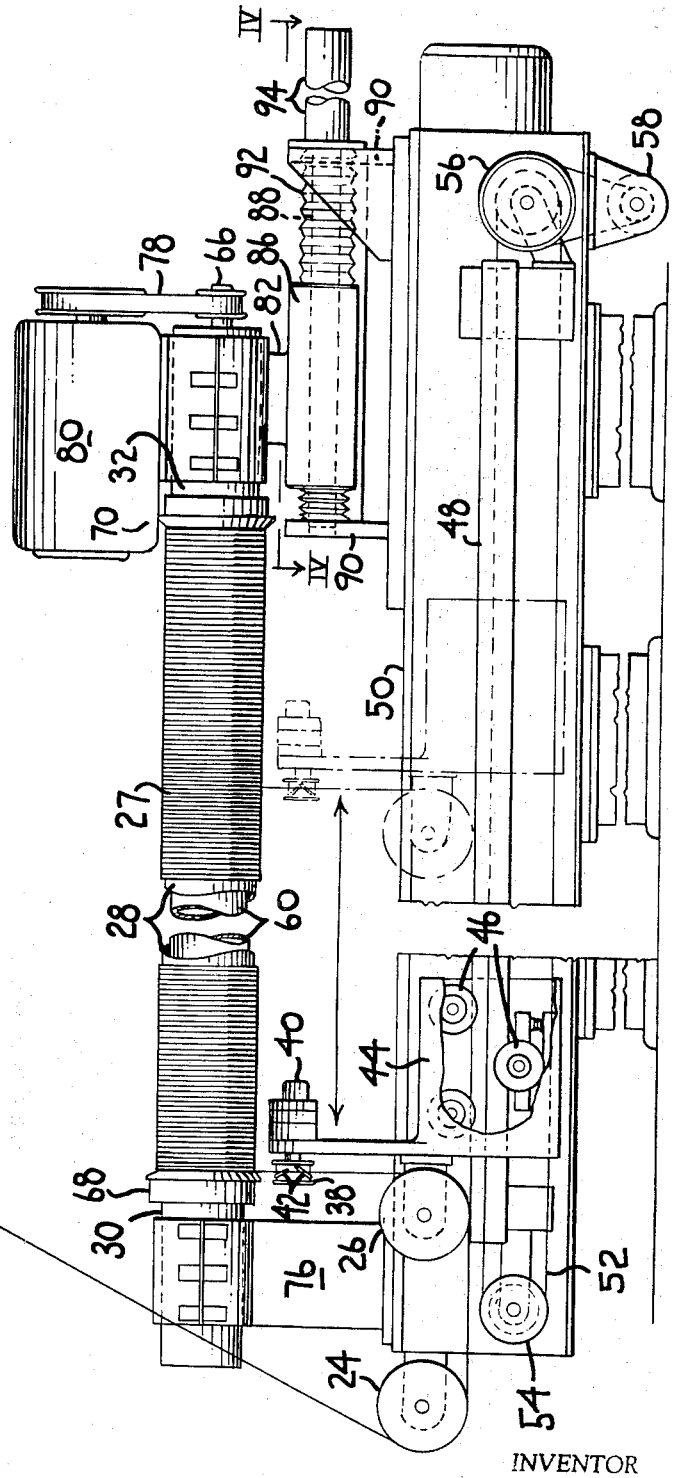
FIG. 1 is an elevational view illustrating a fiber forming apparatus constructed in accordance with this invention.
Figure 1:
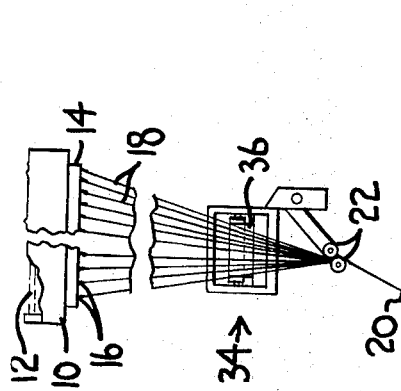

In FIGS. 1 and 2 of the drawings, there is shown a forehearth 10 of a glass melting container containing a supply of molten glass 12 and having a bushing 14 attached to the bottom of the forehearth. The bushing 14 has tips 16, each of which includes an orifice through which molten glass flows as a stream to be attenuated into fibers 18. The bushing 14 is conventional in construction, usually being constructed of platinum or a platinum alloy and may be electrically heated to control the viscosity of the glass therein and that glass flowing through the orifices. As such, the bushing construction and arrangement forms no part of the present invention. The fibers 18 are grouped together as a strand 20 by gathering shoes 22. The strand 20 is drawn across flanged peripheral surfaces of a pair of godet wheels 24 and 26 and wound as a package 27 on a forming tube 28 mounted between a pair of spindles 30 and 32 supported by a base 50.

The fibers 18 are pulled from the bushing tips 16 at a very high rate of speed, for example, about 10,000 to 15,000 feet per minute.

An aqueous size containing a liquid binder and a lubricant is applied to the individual fibers 18 of the strand 20 as they pass over a size applicator 34 mounted just above gathering shoes 22. The size transfer surface of the applicator 34 may be in the form of a moving belt 36 or rotating roller having a film of the size applied to it. The fibers 18 pass over the roller or belt at some tangential point for momentary contact with the sizing solution to transfer the solution from the applicator to the fibers.

The gathering shoes 22 are shown as spaced members having filament-receiving, smoothly-contoured slots therein. Generally, the gathering shoes are stationary and are constructed of a material which will not materially abrade the fibers, such as graphite.

The gathering shoes 22 and size applicator 34 are conventional in construction and may be replaced with other known types of gathering shoes or applicators without departing from the spirit of the present invention.

As the strand 20 is wound on the forming tube 28, it is given a rapid oscillating motion by means of a cam 38 mounted for rotary movement and driven by a motor 40. The cam 38, hereinafter referred to as a high-frequency oscillator, is a cylindrical spindle having raised surfaces 42 along which the strand travels as it is being wound. Here again, the high-frequency oscillator 38 is conventional in construction and may be replaced by other devices without departing from the spirit of this invention. The amplitude of the oscillating motion applied to the strand 20 will vary depending upon the axial distance between the raised surfaces 42. A low amplitude, for example, between about 1/16 inch and one inch, and preferably between about 1/2 inch and 3/4 inch is employed in the practice of this invention. The frequency of the oscillating motion is controlled by the speed at which the high-frequency oscillator 38 is rotated. In the preferred embodiment, the high-frequency oscillator 38 is formed with a cylindrical surface having a diameter of about 1 1/2 inches, a length of 1 1/2 inches, and a pair of raised surfaces which oscillate the strand through an amplitude of 3/4 inch during each revolution of the traverse. The oscillator 38 may be rotated at about 4,000 to 12,000 r.p.m. and is preferably rotated at about 100 r.p.m. greater than the starting speed of the forming tube 28.

The strand is traversed along the length of the forming tube 28 by reciprocating the high-frequency oscillator 38 in opposite directions along a path parallel to the axis of rotation of the forming tube 28 as a package of strand is wound. Oscillator 38 and godet wheel 26 are mounted on a reciprocating carriage 44 provided with rollers 46 which ride along a rail 48 fixed to base 50. Reciprocating carriage 44 is slowly driven at a speed of about 50 to 200 inches per minute in opposite directions by means of a continuous cable 52 fixed to the rear of carriage 44. The cable 52 is taut between and passes over flanged peripheral surfaces of an idler pulley 54 and a pulley 56 driven by an instanteous reversing motor 58. Motor 58 alternately drives the cable 52 and reciprocating carriage 44 in opposite directions, i.e., back and forth along rail 48. Limit switches, not shown, but fixed to the base 50 near each end thereof, are tripped by reciprocating carriage 44 as oscillator 38 reaches a position in vertical alignment with the axially-spaced ends of the forming tube 28. The limit switches by means of related control components, also not shown, respectively reverse the direction motor 58 drives pulley 56 and cable 52, and starts the carriage back in the opposite direction along rail 48.

Godet wheels 24 and 26, gathering shoes 22, and high-frequency oscillator 38 are aligned in the same vertical plane. Godet wheel 24, driven by a motor 25 fixed to base 50, rotates in a fixed position. Godet wheel 26 is an idler wheel mounted for rotary movement with its flanged peripheral surface in vertical alignment with the high-frequency oscillator 38 on reciprocating carriage 44. The strand is thus drawn from gathering shoes 22 at a constant angle, passes over the peripheral surface of driven godet wheel 24, then over the peripheral surface of idler wheel 26, and is delivered to the oscillator 38 in a path substantially normal to the axis of rotation of the oscillator. Godet wheels 24 and 26 may both be idler wheels, may both be driven wheels, or one may be driven and the other an idler wheel as illustrated in the preferred embodiment. When either or both godet wheels are driven, it is preferred that they be driven at a linear peripheral speed slightly in excess of the linear drawing speed of the strand to impart a forward thrust to the strand and reduce the tension on the strand being wound.

The winding apparatus including the forming tube 28 and spindles 30 and 32 is generally illustrated in FIGS. 1 and 2. FIG. 3 is an enlarged elevational view, partly in section, showing, among other things, the manner in which the forming tube 28 is supported between and driven by spindles 30 and 32. Forming tube 28 is a collapsible sleeve supported by a mandrel 60. Forming tube 28 may be formed of paper, plastic or other materials which may be collapsed and removed from the interior of a wound forming package. A polypropelene plastic sleeve measuring about four inches in inside diameter by 36 inches in length and about .020 to .030 inch in thickness, is preferred.

Mandrel 60 is an appropriate length of four-inch O.D. pipe, the ends of which are undercut and fitted with end caps 62. End caps 62 are tightly fitted within the axially-spaced ends of mandrel 60 by a heat-shrinking process.

Spindles 30 and 32 are commercially-available spindles, respectively provided with shafts 64 and 66 mounted for rapid rotary movement about anti-friction bearings provided within spindles 30 and 32. Spindle adapters 68 and 70 are respectively fixed to spindle shafts 64 and 66 by means of spindle nuts 72 tightly secured on threaded rods 74 extending from shafts 64 and 66.

Spindle adapters 68 and 70 are formed with central openings having tapered walls which fit snugly over the corresponding tapered portion of spindle shafts 64 and 66 and concentric tapered surface portions which snugly fit within each respective end cap 62. The spindle shafts 64 and 66 are, of course, positioned in axial alignment in order that smooth, rotary motion may be provided about the longitudinal axis of mandrel 60 and forming tube 28.

Spindle 30 is an idler spindle supported above base 50 by means of a vertical standard 76. Rotary motion is provided to mandrel 60 and forming tube 28 by means of spindle 32. Shaft 66 of spindle 32 is driven by means of a belt 78 which is connected to and driven by a motor 80. Spindle 32 and motor 80 are respectively supported by vertical standard 82 and plates 84 fixed to a carriage 86. Carriage 86 is mounted on a pair of lubricated slides 88 which are mounted on supports 90 rigidly fastened to base 50 (see especially FIGS. 1 and 4). Accordion-like sleeves 92 are attached to the supports 90 and carriage 86 to protect the lubricated slides 88 from dirt or other foreign substances. Air cylinder 94 fixed to one of the vertical supports 90 with its piston 96 fixed to carriage 86 provides power means for driving carriage 86 along lubricated slides 88. Piston 96 of air cylinder 94 is alternately extended and retracted to move carriage 86 and spindle 32 between an operative position and an inoperative position. When piston 96 is extended, it moves carriage 86 and spindle 32 forward so as to engage spindle adapter 70 with mandrel 60 in the manner illustrated in FIGS. 1 and 3. The mandrel 60 is thus held in pressurized engagement between spindle adapters 68 and 70 and the apparatus is ready to begin winding a package of strand. After the winding operation has been completed, piston 96 of air cylinder 94 is retracted withdrawing carriage 86 a distance of about six inches to an inoperative position, whereby spindle adapter 70 is disengaged with mandrel 60 and the mandrel, containing a wound forming package of glass fiber strand, can be doffed and replaced with another mandrel and forming tube for the next winding operation.

Spindle adapters 68 and 70 are respectively formed with surface portions 96 and 98 which are positioned adjacent each axially-spaced end of the forming tube 28 when carriage 86 is moved to the operating position. Surface portions 96 and 98 extend outward from the strand winding surface of forming tube 28 in gradually-diverging relationship with respect to the strand winding surface when spindle adapters 68 and 70 are engaged with the axially-spaced ends of mandrel 60. A small space of a few thousandths of an inch is provided between the base of surface portions 96 and 98 and the strand winding surface of forming tube 28 to permit rapid changing of the mandrel and forming tube between winding operations.

Surfaces 96 and 98 diverge at an angle $\alpha$ with respect to a normal to the strand-collecting surface of forming tube 28. It is generally desirable that angle $\alpha$ be an angle between about 1° and 15° and preferably between about 5° and 10°. Consistently good results have been obtained in the embodiment illustrated with an angle $\alpha$ of about 7°. In FIG. 3 angle $\alpha$ has been greatly exaggerated for purposes of illustration.

The surfaces 96 and 98 thus respectively extend outward from the strand-collecting surface of forming tube 28 in gradually diverging relationship, i.e., each surface 96 and 98 extends outward from the strand-collecting surface at an angle between about 91° and 105°, and preferably between about 95° and 100°, with respect to the strand-collecting surface of forming tube 28.

The operation of the winding apparatus illustrated in FIGS. 1 through 4 is now described.

To begin operation, a group of filaments is drawn over the size applicator, through the gathering shoes, over the peripheral surfaces of the godet wheels and across the strand-collecting surface of the forming tube. Rotation of the forming tube is started by actuation of its motor. As the forming tube attains the proper attenuating and winding speed, about 7,000 r.p.m., the strand is wrapped around the forming tube so as to begin winding.

The high-frequency oscillator and reciprocating carriage are not activated until the strand begins winding. As the winding operation is started, the reciprocating carriage is positioned in vertical alignment with one end of the strand-collecting surface of the forming tube as illustrated in FIG. 1. The reciprocating carriage is positioned with the high-frequency oscillator and periphery of the idler godet wheel in vertical alignment with the base of the gradually-diverging surface of the spindle adapter to initiate winding of a first layer of strand A as diagrammatically illustrated in FIG. 3.

As the first layer of strand begins winding, the motors driving the high-frequency oscillator, the reciprocating carriage and the driven godet wheel are actuated to oscillate the strand and deliver the strand in a first direction along the length of the forming tube. As the traverse carriage approaches the opposite end of the forming tube, it activates a limit switch which reverses the direction of movement of the carriage. The limit switch is located to reverse the direction of movement of the carriage when the high-frequency oscillator and periphery of the idler godet wheel reach a position in vertical alignment with the base of the gradually-diverging surface of the spindle adapter at the end of the forming tube. As the direction of movement of the carriage is reversed, strand is wound against the gradually-diverging surface of the spindle adapter to terminate winding of the first layer of strand A and initiate winding of a superimposed layer of strand B, with the end of layer of strand B spaced outward an incremental distance from the end of layer of strand A as illustrated in FIG. 3.

The carriage then travels along the length of the forming tube to wind layer of strand B and, as it reaches the initial starting position, activates another limit switch which reverses the direction of movement of the reciprocating carriage and initiates winding of a layer of strand C, the end of which is spaced an incremental distance outward from the corresponding end of layer of strand B. The carriage is alternately reciprocated back and forth between the previously-described positions to wind successive layers of strand until the desired thickness or quantity of strand is wound into a package. In the embodiment illustrated, a forming package containing strand wound to a depth of about one inch can be produced in about an hour. During this period the speed of the forming tube is gradually reduced to about 4,700 r.p.m. to compensate for the increasing package diameter and provide a substantially constant attenuating force on the streams of molten glass.

As each layer of strand is completed and the subsequent layer is initiated, the outward component of the throw imparted to the strand by the high-frequency oscillator is restricted by winding the strand against the gradually-diverging end surfaces. This permits winding of a substantially level package of strand comprising a plurality of layers of strand of substantially uniform thickness.

After the desired quantity of strand is wound onto the forming tube, the motors driving the forming tube, the high-frequency oscillator, the reciprocating carriage and godet wheel are stopped and the air cylinder fixed to the carriage supporting the motor driven spindle is activated to withdraw the motor-driven spindle from the mandrel supporting the forming tube. The mandrel supporting the wound package is then withdrawn from the idler spindle and replaced with another mandrel provided with a forming tube for the next winding operation.

The mandrel is then withdrawn from the collapsible forming tube and the forming tube is collapsed and removed from the interior surface of the forming package. The forming package is self-supporting, but, due to the water content of the size contained therein, it may be easily deformed. When dried, the package is substantially rigid and can be handled with little danger of damaging the strand contained in the package. It is preferred to dry the package by directing a flow of warm air through the interior opening of the package. The exterior surface will dry rather quickly at room temperature.

FIG. 5 is a perspective view of a package of glass fiber strand formed in accordance with the present invention. The package illustrated in FIG. 5 has substantially cylindrical inner and outer surfaces and end surfaces which gradually diverge outward from the axially-spaced ends of the inner surface of the package. The angle at which the end surfaces diverge is complementary with the angle α described previously, and for the embodiment shown would be an angle of about 97° with respect to the inner cylindrical surface of the forming package. The package contains a continuous length of glass fiber strand having an interiorly disposed end 29 and an externally disposed end 31.

FIG. 6 diagrammatically illustrates a plurality of forming packages such as that illustrated in FIG. 5 arranged on a pallet 120 to supply a plurality of glass fiber strands to a continuous process not shown. The continuous process may be a filament winding operation, a continuous mat production line, a roving winding process, or a cutting device wherein the strands are cut into short lengths of fibers for use in manufacturing other products. Such continuous processes are known in the fiber glass art and form no part of the present invention. FIG. 6 is included to illustrate the utility of the forming packages produced in accordance with this invention and also to illustrate an improved method and source for supplying a plurality of strands to a continuous process.

In FIG. 6 a plurality of forming packages of the type illustrated in FIG. 5 are arranged in a plurality of superimposed horizontal rows on a pallet 120. The packages comprising the first horizontal row of packages are disposed adjacent one another with their respective longitudinal axes parallel to each other and to the supporting surface of pallet 120. A spacer 122 is provided beneath each forming package to protect the strand from abrasion. Although other spacers may be employed, it is preferred to cradle each forming package in a section of a corrugated fiberboard tube. Lateral movement of the end forming packages in the first horizontal row is restricted by means of blocks 124 fastened to the pallet 120.

Each package of the second horizontal row is then cradled in a spacer 122 and positioned between a pair of adjacent forming packages in the first horizontal row. The forming packages comprising the third row are inserted in fiberboard cylinders 126 and laid between a pair of adjacent packages in the second horizontal row. The fiberboard cylinders 126 serve the dual function of providing spacers between the packages comprising the second and third rows, and covering the upper surfaces of the packages in the third row.

The palletized stack of forming packages may be further secured with metal bands or other straps conventionally employed to secure palletized shipping cartons. The straps are disposed over the third row of packages at right angles to the longitudinal axes of the forming packages. The straps bear against fiberboard cylinders 126 and are fixed to pallet 120. The pallet may then be covered with a flexible protective sheet of waterproof paper or plastic.

With this arrangement, the forming packages of each horizontal row superimposed over the first horizontal row are supported by a pair of adjacent packages in the next lower horizontal row. The packages of each row are centered between the packages of an adjacent row, thereby minimizing the void between the packages and reducing the space occupied by the palletized stack of forming packages. This arrangement obviates the use of vertical and horrizonal separators or supporting platforms, such as those conventionally employed when stacking or shipping wound packages of glass fiber strand, for example see U.S. Pat. Nos. 3,109,540 and 3,160,365. This arrangement also increases the ratio of the mass of glass fiber strand to space occupied by the pelletized stack of packages, thereby providing for more efficient space utilization when shipping, storing or using the packages of strand.

The physical properties of the forming packages previously described make these packages particularly adaptable to the palletized arrangement of packages illustrated in FIG. 6. The substantially cylindrical exterior surfaces of the forming packages and the relatively large mass of strand per unit of cross-sectional areas of each package permit stacking in the manner illustrated. The strand is wound to a substantial depth on a relatively small diameter forming tube. In the preferred embodiment the strand is wound to a depth of about one inch on a forming tube four inches in diameter and 36 inches in length. This produces a forming package containing approximately forty pounds of glass fiber strand. In addition to providing a large quantity of continuous glass fiber strand, these packages are much more rigid than conventional, thin shelled, forming packages. The rigidity offered by the geometry of the forming packages of this invention provides greater ease of handling and permits stacking in the manner previously described. There is thus provided a source of continuous glass fiber strand for a continuous process without the intermediate step of rewinding the strand from a plurality of forming packages into a roving package as is usually practiced. Moreover, the strand is of greater continuous length and more uniform mass because of the size of the package and the manner in which the strand is wound at the ends of the package. These characteristics are particularly desirable in filament winding and other operations where emphasis is placed on materials engineering.

Referring again to FIG. 6, the number of ends of strand required for a continuous process are selected from a corresponding number of forming packages. The interiorly disposed strand ends 29 are withdrawn from a plurality of forming packages, passed through eyelets to group them together and are delivered to the continuous process not shown. The strand is then continually withdrawn from the interior surface of the package until the supply of strand in each package is exhausted.

It should be noted that the forming packages of this invention are sufficiently rigid, i.e., self-supporting, that they may also be disposed with their respective longitudinal axes normal to the supporting surface of the pallet. That is, the forming packages of this invention may be supported on their ends as well as in the horizontal position as shown in FIG. 6.

It should also be noted that conventional, hollow, open-ended, cylindrical roving packages may also be disposed in the manner previously described to minimize the void between the roving packages and provide more efficient space utilization when shipping, storing or using the roving packages.

OTHER EMBODIMENTS

Various modifications may be made to the preferred embodiment without departing from the spirit of this invention.

For example, as a substitute for the mandrel previously described, the means supporting and driving the forming tube may comprise a pair of axially-aligned mandrels each of which is inserted into an end of the forming tube. Each of the mandrels would be formed as an integral part of a spindle adapter plate, or fixed to a spindle, and would extend into the forming tube a distance sufficient to support and rotate the forming tube.

As another modification the gradually-diverging end surfaces may be provided in the form of flanges formed integrally with and extending outward from the axially-spaced ends of the collapsible forming tube. After a package of strand is wound, the forming tube is collapsed and the forming tube and flanges are simultaneously removed from the package of strand.

The gradually-diverging end surfaces may also be curved surfaces having a slope approximating that of the end surfaces previously described.

Because of these and other possible modifications, the scope of the present invention should not be limited by the descriptive details set forth herein except to the extent that such details are incorporated in the accompanying claims.

I claim:

1. In the method of forming and collecting fibers of glass in wound packages including the steps of
    flowing a plurality of streams of heat-softenable material from a supply,
    attenuating said streams to form fibers,
    grouping said fibers together to form a strand, and
    oscillating said strand as it is wound on a rotating collecting surface to wind each wrap of strand in angular relationship with respect to the preceding wrap of strand, the improvement comprising
    rotating a cylindrical strand-collecting surface bounded by axially-spaced removable surfaces which extend outward in gradually diverging relationship from said cylindrical surface,
    winding said strand on said rotating surface in a plurality of superimposed layers extending from one of said axially-spaced surfaces to the other said surface to form a package of strand wound to a substantially-uniform thickness and thereafter removing said axially-spaced surfaces to provide an open-ended package of glass fiber strand.

2. The method of forming and winding glass fiber strand material which includes the steps of
    forming a strand,
    rotating a cylindrical strand-collecting surface bounded by, removable surfaces which extend outward from said cylindrical surface in gradually diverging relationship,
    winding said strand on said collecting surface,
    oscillating said strand at high frequencies to deposit individual wraps of strand in crossing relation on said collecting surface,
    alternately traversing said oscillated strand in opposite directions along the length of said collecting surface to distribute the strand lengthwise of the collecting surface and wind said strand in a plurality of superimposed layers,
    alternately winding said strand against one of said axially-spaced surfaces each time the direction of traversing movement is changed to terminate winding of a first layer of strand and initiate winding of a second layer of strand with the axial end of said second layer of strand spaced outward an incremental distance from the corresponding end of said first layer of strand to form a package of strand wound to a substantially uniform depth on said rotating surface and thereafter removing said axially-spaced surfaces to provide an open-ended package of glass fiber strand.

3. The method of forming and collecting glass fiber strand material in wound packages which includes the steps of
    attenuating a plurality of streams of molten glass to form fibers,
    applying a size to said fibers,
    grouping said fibers together to form a strand,
    rotating a cylindrical strand-collecting surface bounded by axially-spaced surfaces which extend outward from said cylindrical surface at an angle of between about 95° and 100° with respect to said cylindrical surface,
    winding said strand on said collecting surface,
    oscillating said strand at high frequencies as it is wound to wind each wrap of strand in angular relationship with respect to the preceding wrap of strand,
    alternately traversing said oscillated strand in opposite directions along the length of said collecting surface to distribute said strand lengthwise of said collecting surface and wind said strand into a package comprising a plurality of superimposed layers of strand with each of said layers of strand being of substantially uniform thickness and extending from one of said axially-spaced surfaces to the other said surface, and
    thereafter removing said axially-spaced surfaces to provide an open-ended package of glass fiber strand.

4. In apparatus for producing continuous glass fiber strand material which includes a bushing containing molten glass and having a plurality of orifices through which streams of molten glass flow to be attenuated into fibers which are grouped together as a strand, a rotating surface for collecting said strand in the form of a wound package, and means for oscillating said strand onto said rotating surface, the improvement comprising
    a cylindrical strand-collecting surface bounded by removable surfaces which extend outward in gradually-diverging relationship from said strand-collecting surface,
    means for rotating said strand-collecting surface and said end surfaces about the longitudinal axis of said cylindrical surface,
    means for laying said strand in a plurality of superimposed layers of substantially-uniform thickness along the axial length of said strand-collecting surface between said end surfaces to form a package of glass fiber strand wound to a substantially-uniform depth on said rotating surface and means for withdrawing at least one of said outwardly diverging removable surface elements to permit the removal of said wound package from said strand-collecting surface.

5. The apparatus of claim 4 wherein said end surfaces extend outward from said strand-collecting surface at an angle of between about 95° and 100°.

6. Apparatus for forming a strand of glass fibers which comprises a container for holding a supply of molten glass and means for drawing a plurality of glass fibers from the container including
    a guide for grouping the fibers together as a strand,
    a cylindrical winding tube,
    means supporting said tube for rotary movement about the longitudinal axis thereof,
    a removable flange adjacent each axially-spaced end of said tube, said flanges providing surfaces which extend outward in gradually-diverging relationship from the strand-collecting surface of said tube, means supporting said flanges for rotary movement with said tube, means for rotating said tube and said flanges, means for applying a high-frequency, low-amplitude oscillating movement to said strand as it is wound, means for traversing said oscillated strand along the length of said tube between said diverging surfaces to wind said strand in a plurality of superimposed layers, said diverging surfaces limiting the outward component of oscillating movement applied to said strand as the end of each of said layers of strand is wound to provide a package of strand wound to a substantially-uniform thickness and means for withdrawing at least one of said outwardly diverging removable surface elements to permit the removal of said wound package from said strand-collecting surface.

7. The apparatus for forming a strand of glass fibers of claim 6 wherein said gradually-diverging surfaces extend outward from the strand-collecting surface of said tube at an angle of between about 95° and 100°.

8. The apparatus for forming a strand of glass fibers of claim 6 further including a mandrel disposed interiorly of said cylindrical winding tube in driving relation therewith, means adjacent the axially-spaced ends of said tube for supporting said mandrel and said flanges for rotary movement about the longitudinal axis of said mandrel, and means for moving at least one of said supporting means between an operative position wherein said supporting means are engaged with said mandrel and the gradually-diverging surfaces of said flanges are disposed between the axially-spaced ends of said tube, and an inoperative position wherein said mandrel is disengaged from said supporting means and said flanges are removed from said relationship with said winding tube.

References Cited

UNITED STATES PATENTS

| | | |
|---|---|---|
| 2,255,426 | 9/1941 | Lamesch. |
| 2,828,092 | 3/1958 | Taylor _____ 242—163 |
| 3,169,718 | 2/1965 | Smith et al. |
| 3,371,877 | 3/1968 | Klink et al. _____ 242—18 |
| 3,178,130 | 4/1965 | Taylor _____ 242—173 |

S. LEON BASHORE, Primary Examiner

R. L. LINDSAY, JR., Assistant Examiner

U.S. Cl. X.R.

65—11; 242—18, 131, 174